(12) United States Patent
Cao et al.

(10) Patent No.: US 10,374,914 B2
(45) Date of Patent: *Aug. 6, 2019

(54) REROUTING DATA OF A STREAMING APPLICATION

(71) Applicant: International Business Machines Corporation, Armonk, NY (US)

(72) Inventors: Bin Cao, Rochester, MN (US); Jessica R. Eidem, Rochester, MN (US); Brian R. Muras, Rochester, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,593

(22) Filed: Feb. 1, 2018

(65) Prior Publication Data
US 2018/0167292 A1    Jun. 14, 2018

Related U.S. Application Data

(63) Continuation of application No. 14/740,776, filed on Jun. 16, 2015, now Pat. No. 9,954,745, which is a continuation of application No. 14/718,370, filed on May 21, 2015, now Pat. No. 9,967,160.

(51) Int. Cl.
| | | |
|---|---|---|
| *H04L 12/26* | (2006.01) |
| *H04L 9/00* | (2006.01) |
| *G06F 16/2455* | (2019.01) |
| *H04L 12/24* | (2006.01) |
| *G06F 9/455* | (2018.01) |

(52) U.S. Cl.
CPC ............ *H04L 43/045* (2013.01); *G06F 9/455* (2013.01); *G06F 16/24568* (2019.01); *H04L 41/5019* (2013.01); *H04L 43/026* (2013.01); *H04L 43/16* (2013.01)

(58) Field of Classification Search
CPC combination set(s) only.
See application file for complete search history.

(56) References Cited

U.S. PATENT DOCUMENTS

| | | | |
|---|---|---|---|
| 8,335,213 B2 * | 12/2012 | Sindhu | ............... H04L 49/1515 |
| | | | 370/388 |
| 9,563,486 B1 | 2/2017 | Narsude et al. | |
| 9,972,103 B2 | 5/2018 | de Castro Alves et al. | |
| 2006/0230407 A1 | 10/2006 | Rosu et al. | |

(Continued)

OTHER PUBLICATIONS

Cao et al., "Rerouting Data of a Streaming Application" U.S. Appl. No. 14/718,370, filed May 21, 2015.

(Continued)

*Primary Examiner* — Shirley X Zhang
(74) *Attorney, Agent, or Firm* — Martin & Associates, LLC; Bret J. Petersen

(57) ABSTRACT

A streams manager monitors performance of a streaming application and determines if operators are underperforming according to a threshold. When the performance needs to be improved, the streams manager automatically modifies the flow graph to offload or reroute a stream of data, or part of a stream of data, to a similar operator to more efficiently utilize streaming resources. Operators are provided with multiple ports to allow the streams manager to send additional streams to the operator.

6 Claims, 7 Drawing Sheets

(56) References Cited

U.S. PATENT DOCUMENTS

| | | | |
|---|---|---|---|
| 2008/0005392 A1 | 1/2008 | Amini et al. | |
| 2008/0159141 A1 | 7/2008 | Soukup et al. | |
| 2008/0256384 A1 | 10/2008 | Branson et al. | |
| 2009/0319687 A1 | 12/2009 | Goldstein et al. | |
| 2010/0293301 A1 | 11/2010 | Amini et al. | |
| 2011/0041132 A1 | 2/2011 | Andrade et al. | |
| 2011/0047554 A1 | 2/2011 | Lakshmanan et al. | |
| 2011/0083046 A1 | 4/2011 | Andrade et al. | |
| 2011/0314019 A1* | 12/2011 | Jimenez Peris | G06F 9/5066 707/737 |
| 2012/0137018 A1* | 5/2012 | Uhlig | G06F 11/004 709/231 |
| 2012/0222031 A1 | 8/2012 | Derr et al. | |
| 2013/0031556 A1 | 1/2013 | Branson et al. | |
| 2013/0081046 A1 | 3/2013 | Accola et al. | |
| 2013/0166948 A1 | 6/2013 | Branson et al. | |
| 2013/0166962 A1 | 6/2013 | Branson et al. | |
| 2013/0219405 A1 | 8/2013 | Lee et al. | |
| 2013/0290966 A1 | 10/2013 | Branson et al. | |
| 2014/0059210 A1 | 2/2014 | Gedik et al. | |
| 2015/0103837 A1 | 4/2015 | Dutta | |
| 2016/0004751 A1* | 1/2016 | Lafuente Alvarez | G06F 17/30516 707/718 |
| 2016/0241430 A1* | 8/2016 | Yadav | H04Q 11/04 |
| 2016/0283554 A1 | 9/2016 | Ray et al. | |

OTHER PUBLICATIONS

Cao et al., "Rerouting Data of a Streaming Application" U.S. Appl. No. 14/740,776, filed Jun. 16, 2015.

Cao et al., "Rerouting Data of a Streaming Application" U.S. Appl. No. 15/886,463, filed Feb. 1, 2018.

IBM, Appendix P—List of IBM Patents or Patent Applications Treated As Related, dated Mar. 2, 2018.

* cited by examiner

REROUTING DATA OF A STREAMING APPLICATION

BACKGROUND

1. Technical Field

This disclosure generally relates to streaming applications, and more specifically relates to rerouting a stream of data of an underperforming or overloaded operator to a compatible operator of another flow graph.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in resources to meet that demand.

BRIEF SUMMARY

A streams manager monitors performance of a streaming application and determines if operators are underperforming according to a threshold. When the performance needs to be improved, the streams manager automatically modifies the flow graph to offload or reroute a stream of data, or part of a stream of data, to a compatible operator to more efficiently utilize streaming resources. Operators are provided with multiple ports to allow the streams manager to send additional streams to the operator.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
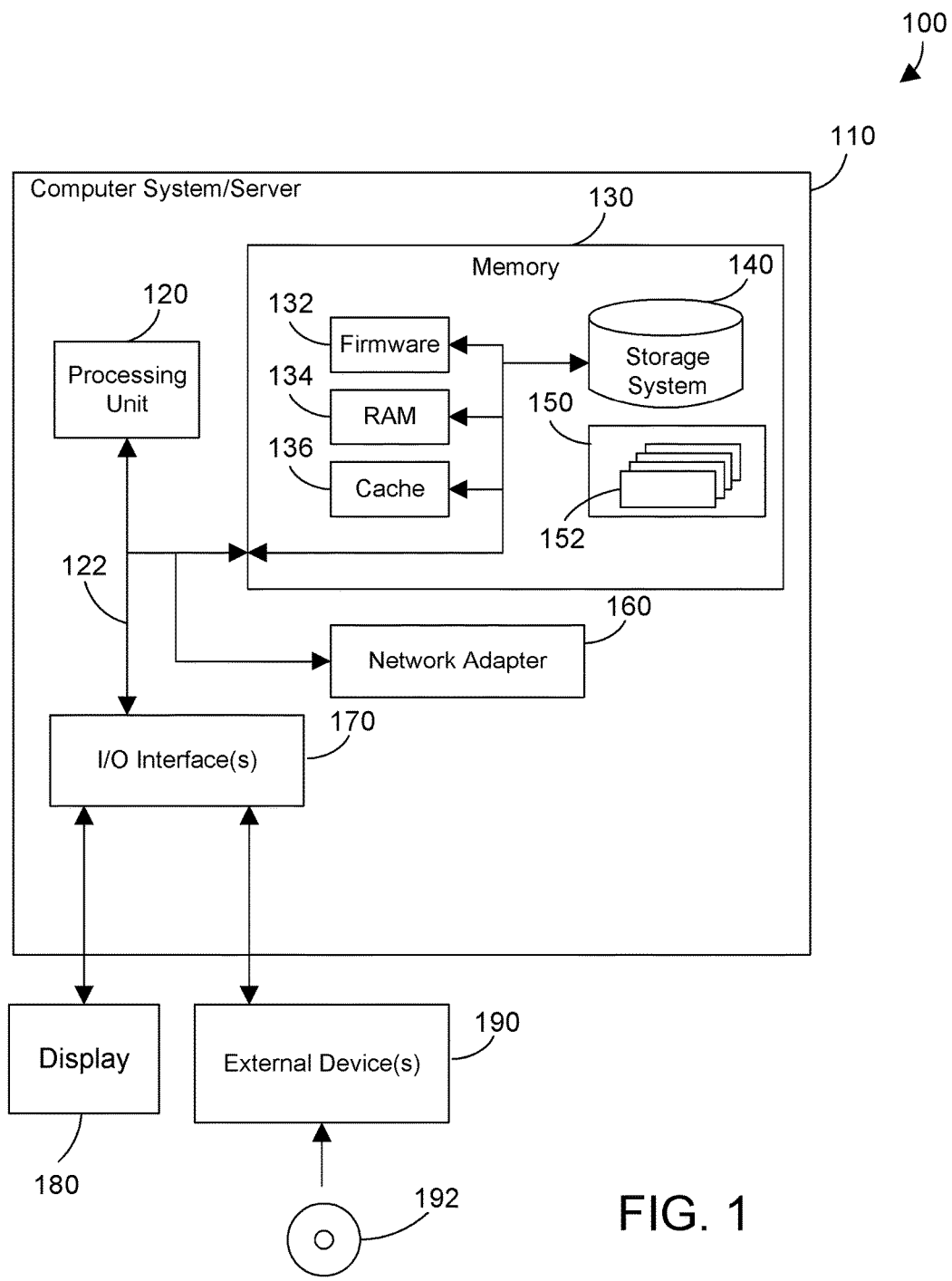
FIG. 1 is a block diagram of a cloud computing node.

The disclosure and claims herein relate to a streams manager that monitors performance of a streaming application and determines if operators are underperforming according to a threshold. When the performance needs to be improved, the streams manager automatically modifies the flow graph to offload a stream of data, or part of a stream of data, to a compatible operator to more efficiently utilize streaming resources. Operators are provided with multiple ports to allow the streams manager to send additional streams to the operator.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
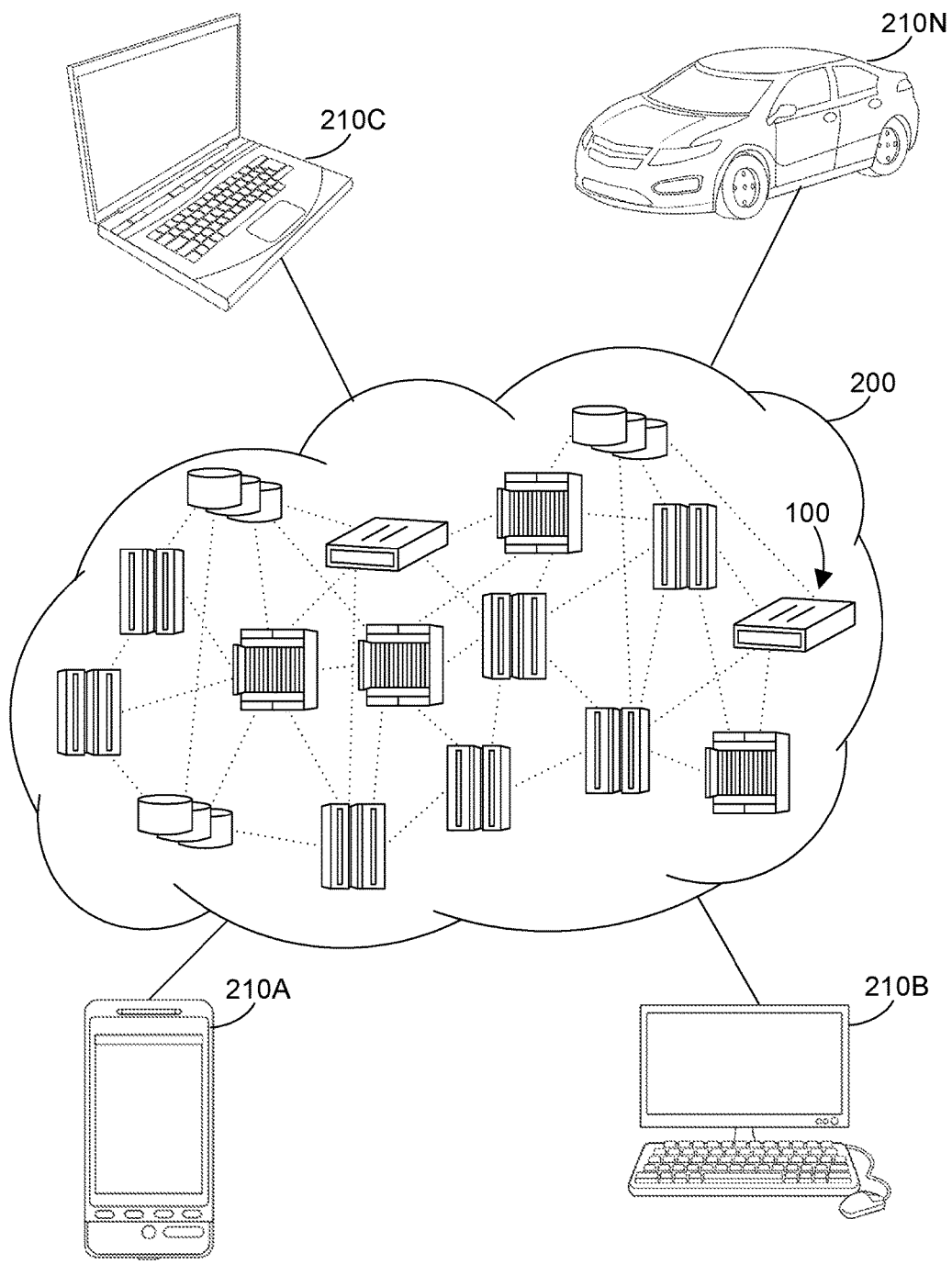
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
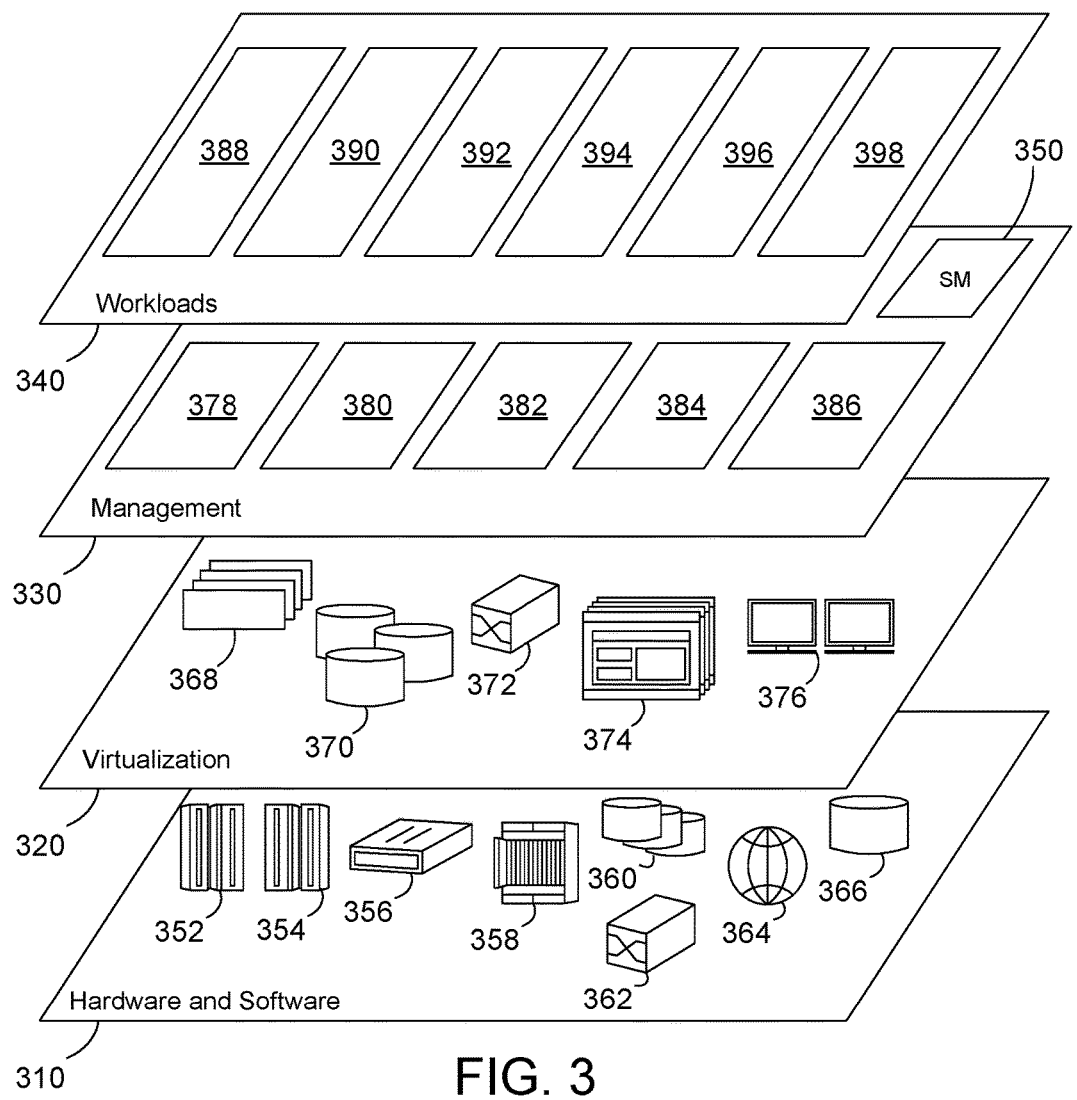
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 350 as described herein. While the SM 350 is shown in FIG. 3 to reside in the management layer 330, the SM 350 actually may span other levels such as the applications layer 340 shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
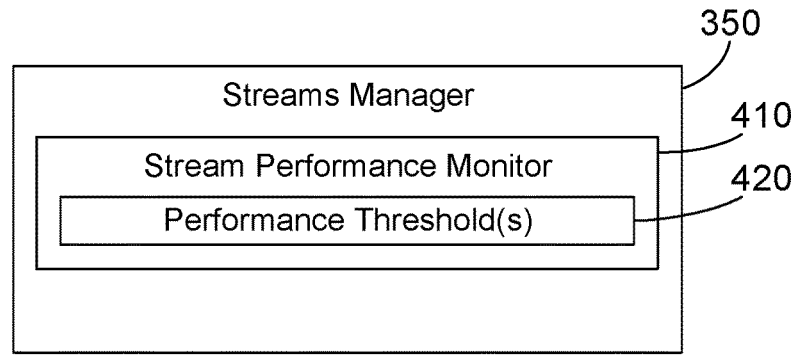
FIG. 4 is a block diagram showing an example of a streams manager that offloads a stream of data on an overloaded operator to a similar operator of another flow graph as described herein.

FIG. 4 shows one suitable example of the streams manager 350 shown in FIG. 3. The streams manager 350 is software that manages one or more streaming applications, including managing operators and data flow connections between operators in a flow graph that represents a streaming application. The streams manager 350 includes a performance monitor 410 with one or more performance thresholds 420. Performance thresholds 420 can include static thresholds, such as percentage used of current capacity or tuple rate, and can also include any suitable heuristic for measuring performance of a streaming application as a whole or for measuring performance of one or more operators in a streaming application. Performance thresholds 420 may include different thresholds and metrics at the operator level, at the level of a group of operators, and/or at the level of the overall performance of the streaming application. The stream performance monitor 410 monitors performance of a streaming application, and when current performance compared to the one or more performance thresholds 420 indicates current performance needs to be improved, the stream performance monitor 410 communicates with the streams manager 350 to attempt to improve performance by rerouting streams to another operator as described further below.

As discussed above, the streams manager 350 includes a performance monitor 410 to monitor the performance of a streaming application and the operators of the streaming application. The performance monitor 410 determines when the performance of a streaming application can be and needs to be improved and attempts to improve performance by rerouting streams to another operator. Determining whether an operator is underperforming may include tracking performance of the streaming application's operators. Performance can be determined in various ways. For example, an underperforming operator can be determined by comparing the operator performance against historical data. Logs and other records of performance indicators from the same or similar operators can be collected and compared to the current performance. Performance indicators could include for example: error rate, dropped tuple rate, response time, resource utilization, etc. Underperforming could also be determined by comparing the relative performance of the operators. The relative performance could be determined by comparing to historical patterns or the percent of resources required by the different operators. Underperforming operators could also be determined by comparing the performance of the operators to the performance threshold(s) 420 in FIG. 4. A threshold range could also be set as an optimal performance range for an operator and anything that is outside of that range will trigger a response. If the performance is below the range the operator is underperforming. The performance range could be a combination of performance thresholds.

Figure 5:
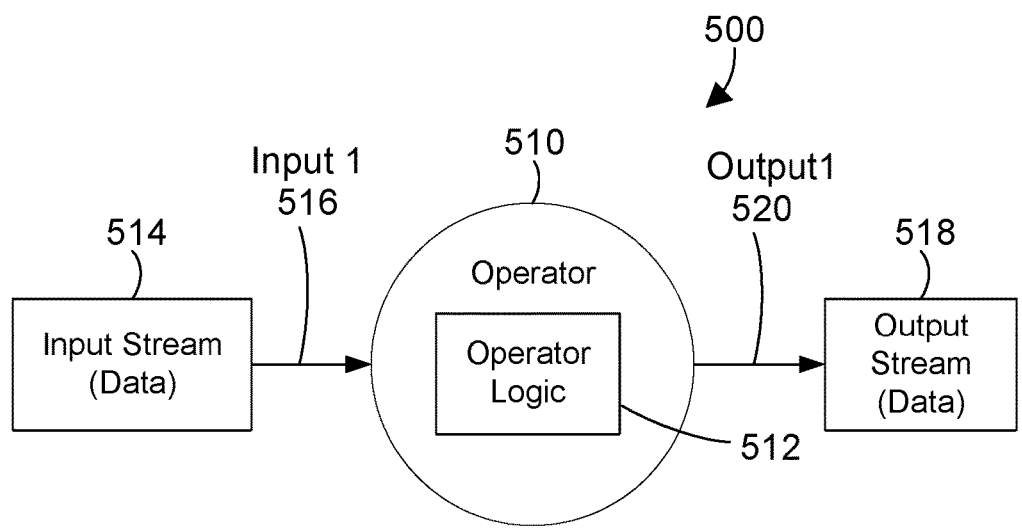
FIG. 5 is a block diagram showing an operator of a streaming application according to the prior art.

FIG. 5 is a block diagram 500 showing an operator 510 of a streaming application according to the prior art. Streaming applications typically include multiple operators coupled together in a flow graph that process streaming data in near real-time. An operator typically takes in streaming data in the form of data tuples, operates on the tuples in some fashion, and outputs the processed tuples to the next operator or another application. In this simple example, the operator 510 includes operator logic 512. The operator logic 512 represents the function or operation the operator 510 performs on input stream 514. Input stream 514 is sent to the operator 510 on an input 516. After the input data stream is processed by the operator logic 512 the operator 510 outputs an output stream 518 on an output 520.

Figure 6:
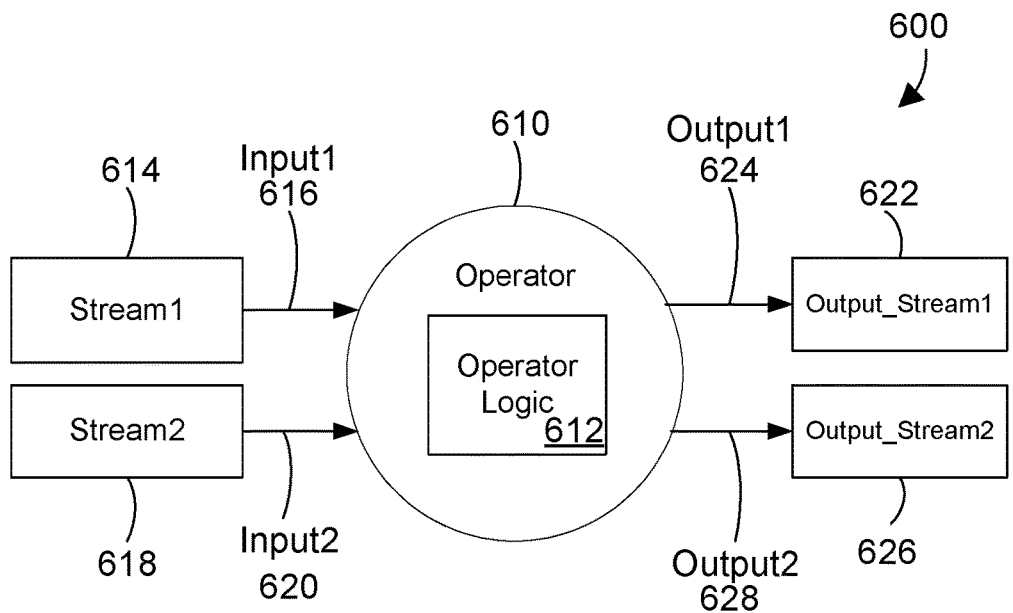
FIG. 6 illustrates a block diagram of an operator with multiple ports as described herein.

FIG. 6 illustrates a block diagram 600 of an operator 610 with multiple ports as used and described herein. The operator 610 is similar to prior art operators in that it is also part of a streaming application that process streaming data in near real-time to process data tuples and outputs the processed tuples to the next operator. However, the operator 610 is different from the prior art operators by providing multiple ports, as shown in FIG. 6. In this simple example, the operator 610 includes operator logic 612. The operator logic 612 represents the function or operation the operator 610 performs on one or more input data streams. In this simple example, data is input from two data streams. Input stream1 614 is applied to input1 616 and stream2 618 is applied to input2 620. Data tuples in stream1 614 and stream2 618 are sent to the operator 610 to be processed by the operator logic 612. After the input data streams are processed by the operator 610 the operator 610 outputs stream 1 as output_stream 1 622 on output1 624 and outputs stream2 as output_stream2 626 on output2 628.

Again referring to FIG. 6, the operator 610 as described herein is a software application or a portion of a streaming software application that processes streaming data in near real-time. The operator 610 is shown with two input ports 616, 620 as described above. The operator 610 may be programmed and compiled to include multiple ports when it is created. The number of ports could be any number depending on the specific application and is not limited to two ports as shown. The input ports may be initially unused at run time and then configured by the streams manager to offload stream data as described herein by rerouting stream data to the newly configured input port of the operator. The input ports of the operator 610 may be similar to common communication protocol ports as used in the prior art. The operator 610 is programmed to process input streaming data that is placed on the input ports and place a result on a corresponding output port. The streams manager reroutes a data stream by modifying the flow graph. This may include configuring the various applications links or addressing to send data to the unused input ports or ports of an operator that is determined to be compatible and has available input ports. The configuration to reroute data streams may also include using internet protocol addressing to change the destination of data tuples to the available operator input.

Figure 7:
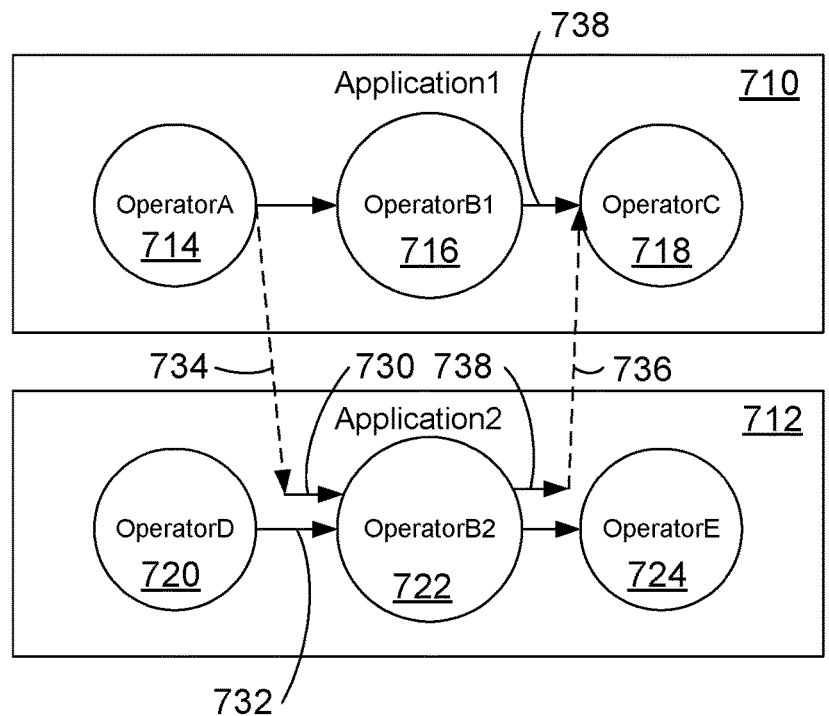
FIG. 7 illustrates a block diagram of a simplified example for rerouting data of a streaming application to another operator.

FIG. 7 illustrates a simplified example of rerouting data of a streaming application to another operator. A streaming application1 710 has three operators, operatorA 714, operatorB1 716, and operatorC 718. OperatorA 714 originates a stream of tuples, which is processed by operatorB1 716 and output to operatorC 718. The tuples from operatorA 714 are processed by logic (not shown) in operatorB 718 as described above. Similarly, another streaming application2 712 has three operators, operatorD 720, operatorB2 722, and operatorE 724. The streams manager 350 (FIG. 4) monitors performance of the streaming application1 710 to determine if an operator is underperforming. In this example, we assume operatorB1 716 is found to be underperforming according to one or more of the defined thresholds as described in detail above. The streams manager in conjunction with the cloud manager then modifies the flow graph of the streaming application to offload all or a portion of the stream to a compatible operator, in this case operatorB2 722 in application2 712. As a result, application1 710 can utilize the resources of the physical machine or virtual machine hosting application2 712 to improve the overall performance of streaming application1 710.

Again referring to FIG. 7, the streams manager 350 modifies the flow graph of the streaming application1 710 to reroute all or a portion of the stream from operatorA 714 to operatorB1 716 to the compatible operatorB2 722. OperatorB2 722 has two input ports 730, 732. Having determined that operatorB2 722 is compatible the streams manager determines that operatorB2 has an available input port 730 that is not being used. The streams manager may also check to determine if operatorB2 722 has sufficient capacity to handle the extra load from operatorB1 716 prior to rerouting. The streams manager then modifies the flow graph to send all or a portion of the output data from operatorA 714 to operatorB2 722 by rerouting data 734 from operatorA 714 to the available input port 730. The streams manager also modifies the flow graph to route the output data 736 from operatorB2 722 on output port 738 to operatorC 718 which is the original destination for output data from operatorB1 716. The streams manager may determine an operator is compatible in various ways. For example, the operators may be determined to be compatible by looking at an operator signature similar to the method used in object oriented programming. Further, the operators could be determined to be compatible because the two are each an instance of a single class or program. Or they could be determined to be compatible based on a naming hierarchy or naming scheme where siblings in a multi-layer directory or naming structure are known to be compatible operators.

While operatorB2 722 is shown in FIG. 7 as an operator running in a separate streaming application, operatorB2 could instead be an operator that is not part of a different application. For example, operatorB2 722 could be a different operator in application1 710, or could be an operator that has been created in a ready state but has not yet functioned as part of any application. The disclosure and claims herein expressly extend to offloading tuples to an operator that has multiple ports, whether the operator is in a different streaming application or not.

Figure 8:
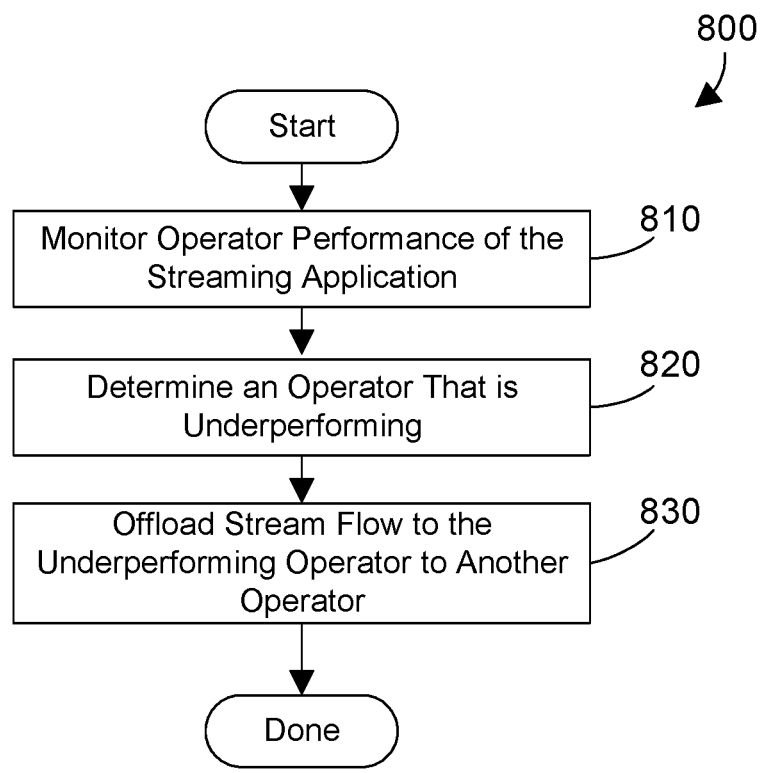
FIG. 8 is a flow diagram of a method for a streams manager to redirect data flow to another operator.

Referring to FIG. 8, a method 800 shows one suitable example for enhancing performance of a streaming application. Method 800 is preferably performed by the streams manager 350. The streams manager monitors performance of the streaming application (step 810). The streams manager determines at least one operator in the flow graph that is underperforming (step 820). The streams manager then offloads stream flow from the operator that is underperforming to another operator (step 830). The method is then done.

Figure 9:
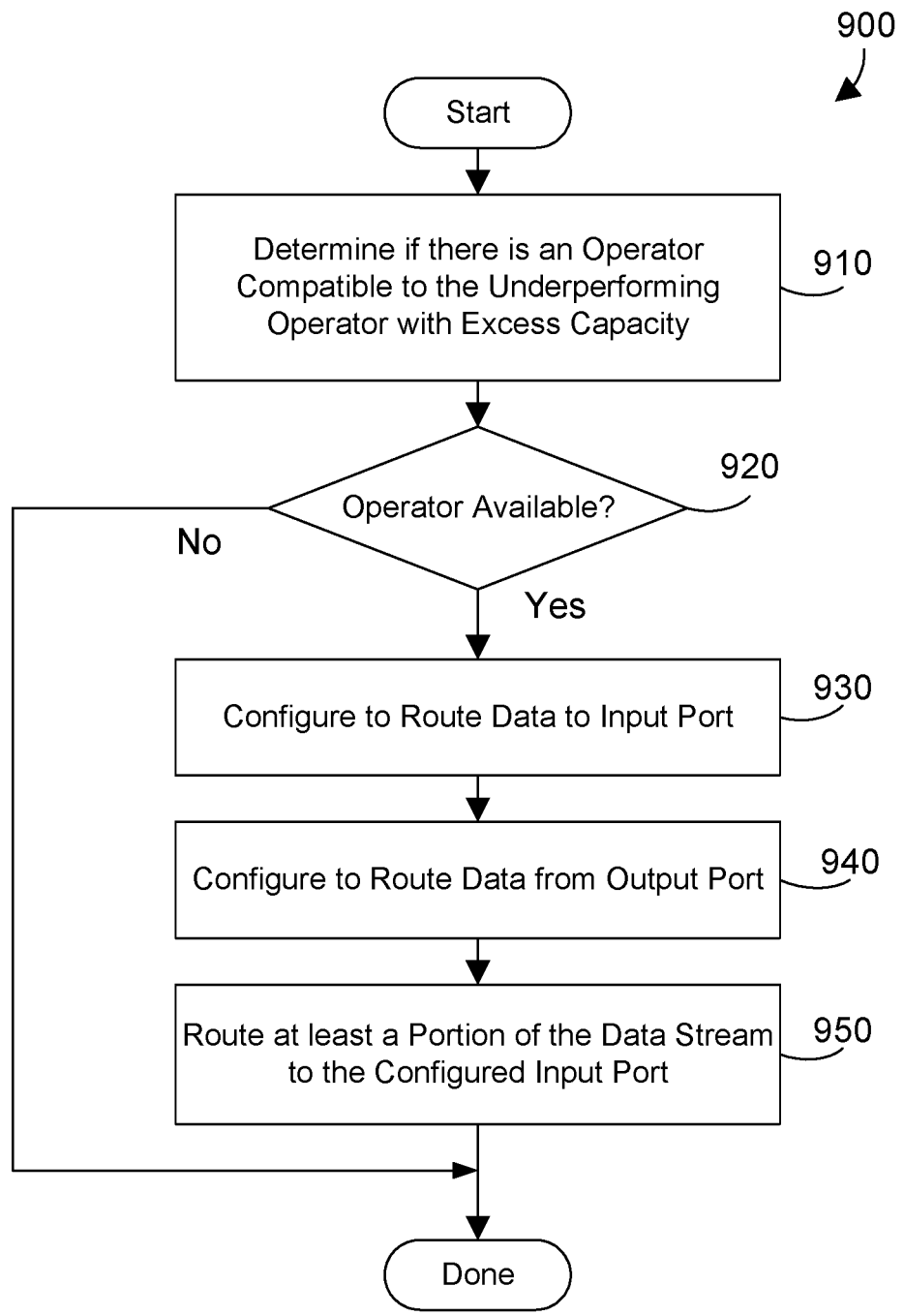
FIG. 9 is a flow diagram of a specific method for step 830 in FIG. 8 for a streams manager to redirect stream flow to another operator.

FIG. 9 shows one suitable example of a method for a streams manager to offload stream flow of an operator that is underperforming to another operator. Method 900 thus shows a suitable method for performing step 830 in method 800. The streams manager determines if there is a compatible operator that is sufficiently similar to the underperforming operator with excess capacity (step 910). If there is no operator available (step 920=no) then the method is done. If there is an operator available (step 920=yes) then configure the flow graph to route data to an available input port of the available operator (step 930). The streams manager then configures the flow graph to route output data from the available operator on the corresponding output port to the destination of the data in the original data flow (step 940). Then route at least a portion of the data stream to the configured input port (step 950). The method is then done.

The disclosure and claims herein relate to a streams manager that monitors performance of a streaming application on a physical or virtual machine and determines if operators are underperforming according to a threshold. When the performance needs to be improved, the streams manager automatically modifies the flow graph to offload a stream of data, or part of a stream of data to a similar operator to more efficiently utilize streaming resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the cloud described herein could be a multi-cloud environment where the cloud manager is a multi-cloud manager such that the VMs provided to the streams manager are located on different clouds.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of operators that process data comprising a plurality of data tuples; and
   a streams manager residing in the memory and executed by the at least one processor, wherein the streams manager monitors performance of the plurality of operators of the streaming application, and when the streams manager determines a first operator of the flow graph is underperforming, the streams manager identifies a second operator that has excess capacity and is compatible with the first operator, wherein the second operator has a first input port that receives data from a second streaming application and first output port that outputs data to the second streaming application, and wherein the second operator has a second input port and a second output port;
   wherein the streams manager reroutes the data flowing to the first operator to flow to the second input port of the second operator; and
   wherein the streams manager reroutes the data to the second operator by configuring the first operator to send data to an input port of the second operator and configures the second operator to send output data to a third operator connected to the first operator in the flow diagram.

2. The apparatus of claim 1 wherein the streams manager determines the first operator is underperforming by comparing current performance of the plurality of operators of the streaming application to at least one defined performance threshold.

3. The apparatus of claim 1 wherein the streams manager determines the second operator of the streaming application is underperforming by comparing the performance of the first operator against historical data.

4. The apparatus of claim 3 wherein the historical data includes records of performance indicators from the same or similar operators that are collected and compared to the current performance.

5. The apparatus of claim 4 wherein where the performance indicators include error rate, response time, and resource utilization.

6. The apparatus of claim 1 wherein the streaming application is in a cloud environment.

* * * * *